UNITED STATES PATENT OFFICE.

JOSÉ MARTINEZ ANCIRA, OF NEW YORK, N. Y.

COMPOSITION OF MATTER AS A NON-CONDUCTOR OF ELECTRICITY.

SPECIFICATION forming part of Letters Patent No. 688,813, dated December 17, 1901.

Application filed July 26, 1901. Serial No. 69,743. (Specimens.)

*To all whom it may concern:*

Be it known that I, JOSÉ MARTINEZ ANCIRA, a citizen of the Republic of Mexico, residing at No. 235 Brook avenue, in the city of New York, in the county of New York and State of New York, have invented a new and useful Composition of Matter as a Non-Conductor of Electricity, of which the following is a specification.

My composition consists of the following ingredients, combined in the proportions stated, viz: cotton, (or other organic fiber,) by weight, one part; powdered slaked lime, (or cement,) by weight, two parts; milk in sufficient quantity to make a sticky paste. These ingredients are to be thoroughly mixed and rubbed or ground together in a mortar or similar vessel or on a stone or other like hard surface until the cotton or other fiber is disintegrated and the whole mass becomes a thick paste. The paste may then be applied in its moist state to the surface of any conductor of electricity which it is desired to insulate and where it is practicable to apply the same and allowed to dry thereon, or it may be molded or pressed into blocks, plates, or any other desired shape or form and allowed to dry. For ordinary purposes the pressure applied in molding the composition into forms and shapes need be but slight; but when it is desired to insulate conductors carrying currents of highest potential better results are obtained if the composition be subjected to a high degree of pressure.

The composition when dry is light and tough and may be perforated without cracking or breaking it. It is a perfect non-conductor of electricity and may be used for insulating purposes.

When the composition is pressed into blocks, plates, or other forms and allowed to dry, as above described, before using it for insulating purposes, it may be applied or affixed to surfaces which it is desired to insulate by cement or in any other suitable and practicable manner.

The insulating properties of the composition will be improved by covering it, before it becomes set and while it is still moist, with silica in a powdered state and then subjecting the whole to a high pressure. The particles of silica are thereby forced into the mass and form a coating on the outside of the compound. Also the composition may be rendered fireproof by treating it with a solution of alum, which will not impair its properties as a non-conductor of electricity.

In the composition of matter above described any organic fiber may be used; but cotton is preferable, and hydraulic cement is the preferable form of lime to be used.

What I claim, and desire to secure by Letters Patent of the United States, is—

1. The herein-described composition of matter consisting of an organic fiber, lime and milk, substantially as described and for the purposes set forth.

2. The herein-described composition of matter consisting of cotton, lime and milk substantially as described and for the purposes set forth.

3. The herein-described composition of matter consisting of an organic fiber, hydraulic cement and milk, substantially as described and for the purposes set forth.

4. The herein-described composition of matter consisting of cotton, hydraulic cement and milk, said ingredients being mixed together in substantially the proportions and manner specified and for the purposes set forth.

5. As a new non-conductor of electricity, the herein-described composition of matter consisting of one part by weight of cotton, two parts by weight of hydraulic cement and a sufficient quantity of milk to make a sticky paste, said ingredients being mixed together substantially as described and for the purposes set forth.

In testimony whereof I have signed my name to this specification in the presence of two subscribing witnesses.

JOSÉ MARTINEZ ANCIRA.

Witnesses:
C. VIADERO,
E. G. DUVALL.